United States Patent [19]
Liu et al.

[11] Patent Number: 5,119,285
[45] Date of Patent: Jun. 2, 1992

[54] SOLID-STATE POWER TRANSFORMER CIRCUIT

[75] Inventors: Gang Liu, Detroit; Michael P. Polis, Grosse Pointe Park; Beijing Wang, Detroit, all of Mich.

[73] Assignee: Wayne State University, Detroit, Mich.

[21] Appl. No.: 679,912

[22] Filed: Apr. 3, 1991

[51] Int. Cl.[5] ............................................. H02M 3/335
[52] U.S. Cl. ...................................... 363/127; 363/44; 363/89
[58] Field of Search ................ 363/44, 45, 46, 39, 363/89, 127

[56] References Cited

U.S. PATENT DOCUMENTS

| | | | |
|---|---|---|---|
| 4,319,144 | 3/1982 | King et al. | 363/127 |
| 4,399,499 | 8/1983 | Butcher et al. | 363/127 |
| 4,535,203 | 8/1985 | Jenkins et al. | 363/127 |
| 4,792,887 | 12/1988 | Bernitz et al. | 363/89 |
| 4,819,147 | 4/1989 | Bingham | 363/89 |
| 4,831,508 | 5/1989 | Hunter | 363/89 |

Primary Examiner—Peter S. Wong
Attorney, Agent, or Firm—Brooks & Kushman

[57] ABSTRACT

A solid-state power transformer circuit is provided for converting the positive and negative periods from an AC input signal having a predetermined frequency and applied to an input of the circuit into a high frequency signal and, subsequently, converting the high frequency signal into a regulated output signal at an output of the circuit. A plurality of electronic optically-coupled switches are utilized for chopping the AC input signal at a chopping frequency. The switches are controlled by the oscillator of an integrated circuit to adjust the duty cycle of the switches. A filter, in the form of a pair of capacitors, is connected between the input and output to suppress the high-frequency voltage harmonics produced during chopping. The capacitors, in combination with other capacitive and resistive elements of the circuit provide a total separation impedance between the input and output of the circuit to electrically isolate the output from the input. The integrated circuit also includes a switch and a controller which controls the switch and oscillator by monitoring the output signal and comparing the output signal with a reference signal so that the oscillator produces a control signal for controlling the duty cycle of the optically-coupled switches so that the output signal is regulated.

12 Claims, 2 Drawing Sheets

SOLID-STATE POWER TRANSFORMER CIRCUIT

TECHNICAL FIELD

This invention relates generally to electrical power transformation and, more particularly, to a solid state circuit for performing the functions of a conventional iron core transformer.

BACKGROUND ART

Electrical power transformers are used primarily as voltage transformation devices wherein the voltage input is either transformed up to a higher level or down to a lower level. In the distribution of electrical energy it is customary to transform the voltage up to a higher level at the generating source, distribute the energy via transmission lines at the high level and then transform the voltage back to a lower level for use by the load. This is an efficient means of transmitting electrical energy over long distances. For short distances, the transformer is used to adapt loads designed for different voltages to the local distribution system and to provide voltage separation for safety reasons.

Power transformers generally consist of insulated copper wire wound on an iron core and, in its simplest form, consists of two windings usually referred to as a primary winding and a secondary winding. The turns ratio on these two windings establish the voltage step up or down characteristics of the device. At very low power levels, a single winding is sometimes used in a configuration referred to as an auto transformer. In some of these devices, the input/output voltage ratio is varied by a sliding contactor thereby making electromechanical contact with non-insulated portions of the single winding.

The electrical power transformer has been the backbone of the electric utility distribution system for many years. The power transformer has a high efficiency and a good history of reliability. However, in these days of energy consciousness and environmental restrictions, all aspects of electrical hardware engineering from power distribution through distribution to the end user are under scrutiny.

Iron core and copper coils are heavy, bulky and relatively expensive to manufacture. Because such transformers first transform electrical energy to magnetic energy which, in turn, is transferred back to electrical energy, some energy is dissipated in this procedure.

Prior art solid-state transformers do not require an iron core and copper coils. They are composed of integrated circuits, capacitors and inductors. Such a transformer transforms electrical energy directly from input to output in electrical form so that its energy efficiency is relatively high. Even though integrated circuits in a solid state transformer do consume some energy, such energy consumption is relatively small.

One example of such a solid-state transformer is disclosed in the U.S. Pat. No. 4,347,474, to Brooks et al. The Brooks '474 patent discloses a solid-state regulated power transformer with pulse-width modulation. An AC input signal is chopped in a solid state switching converter at a frequency substantially higher than the frequency of the input signal and then filtered to attenuate the high-frequency components while passing the frequency of the AC input signal. A feedback signal modulates the duty cycle of the switching converter to provide automatic voltage regulation under varying loads and leading and lagging power factors.

The Loen U.S. Pat. No. 4,598,349 discloses a high-frequency electronic transformer comprising flyback converters. An input capacitor of one embodiment keeps the high-frequency voltage harmonics produced by the switching operation remote from the mains. The input capacitor has relatively low impedance at the switching frequency and a relatively high impedance at the output frequency.

The Das U.S. Pat. No. 4,866,585 discloses an AC to DC high-frequency switching power supply.

The Peters et al. U.S. Pat. No. 4,408,268 discloses an AC duty cycle modulated voltage controller.

The Olla U.S. Pat. No. 4,302,717 discloses a switched AC pulse width modulator power supply.

Soviet Union Patent Document No. 488,197 discloses a pulse width modulated switch mode AC power supply.

Other patents of a more general interest include U.S. Pat. No. 3,517,297 to Durio et al, McMurray U.S. Pat. No. 3,538,417, Derby U.S. Pat. No. 3,735,237, Yokoyama U.S. Pat. No. 4,321,662, Okuyama et al U.S. Pat. No. 4,328,454, Shima et al U.S. Pat. No. 4,361,866 and Schutten et al U.S. Pat. No. 4,706,183.

One problem associated with such prior art solid state transformers is that while such transformers provide the voltage transformation function, such transformers do not provide a separation function. For example, in the '349 Patent noted above, at FIGS. 2A-2D, S4 and S3 yield a direct path between input CD and output EF.

With respect to the '474 Patent noted above, there is a direct path between input point 12 and output point 34, since both are grounded.

One attempt to solve this separation function problem of the prior art is by specifying the way to plug the input to the power source. However, this approach is not practical since not all power sockets are marked with polarity and, if a fuse on the grounding wire is blown (a 50% probability if a fuse on the circuit is blown); the whole transformer circuit will have a relatively high voltage potential (110 volts in the U.S.) which is beyond the recommended safety value (i.e. 35 volts) for human beings.

SUMMARY OF THE INVENTION

One object of the present invention is to provide a solid-state power transformer which not only has a voltage transformation function but also a separation function.

Another object of the invention is to provide a solid-state power transformer which has a separation function realized by relatively small, inexpensive capacitors.

In carrying out the above objects and other objects of the present invention, a solid-state power transformer circuit is provided for converting the positive and negative periods of an AC input signal having a predetermined frequency applied to an input of a circuit into a high frequency signal and, subsequently, converting the same to produce a regulated output signal at an output of the circuit. The circuit includes means for chopping the AC input signal at a chopping frequency. The means for chopping is controlled by adjusting the duty cycle. The circuit further includes first filter means for suppressing the high frequency voltage harmonics produced during chopping and means for monitoring the output signal and comparing the output signal with the reference signal to produce a control signal for controlling the duty cycle of the means for chopping so that the output signal is regulated. The first filter means is connected between the input and output so that the total separation impedance of the circuit at the predetermined frequency of the input signal is sufficient to safely, electrically isolate the output from the input of the circuit.

Preferably, the input has first and second input terminals and the output has first and second output terminals wherein the first filter means includes a first capacitor connected between the first input terminal and the first output terminal and a second capacitor connected between the second input terminal and the second output terminal.

Also, preferably, the circuit further includes converter means for converting the chopped AC signal to a DC signal. The energy from the DC signal is initially accumulated on a capacitor. This accumulated energy is used by an oscillator to produce a start signal for starting the operation of the means for chopping.

The advantages accruing to the solid state power transformer circuit are numerous. For example, such a solid-state power transformer circuit is easy to manufacture, small in size, light and inexpensive, since the transformer circuit does not utilize iron cores and copper coils which are heavy, expensive and bulky. Also, such a solid-state power transformer circuit provides not only a voltage transformation function but also a separation function to safely electrically isolate the output from the input of the circuit. This separation function is accomplished by the high value of the total separation impedance between the input and output of the circuit and is principally realized by relatively small value capacitors.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
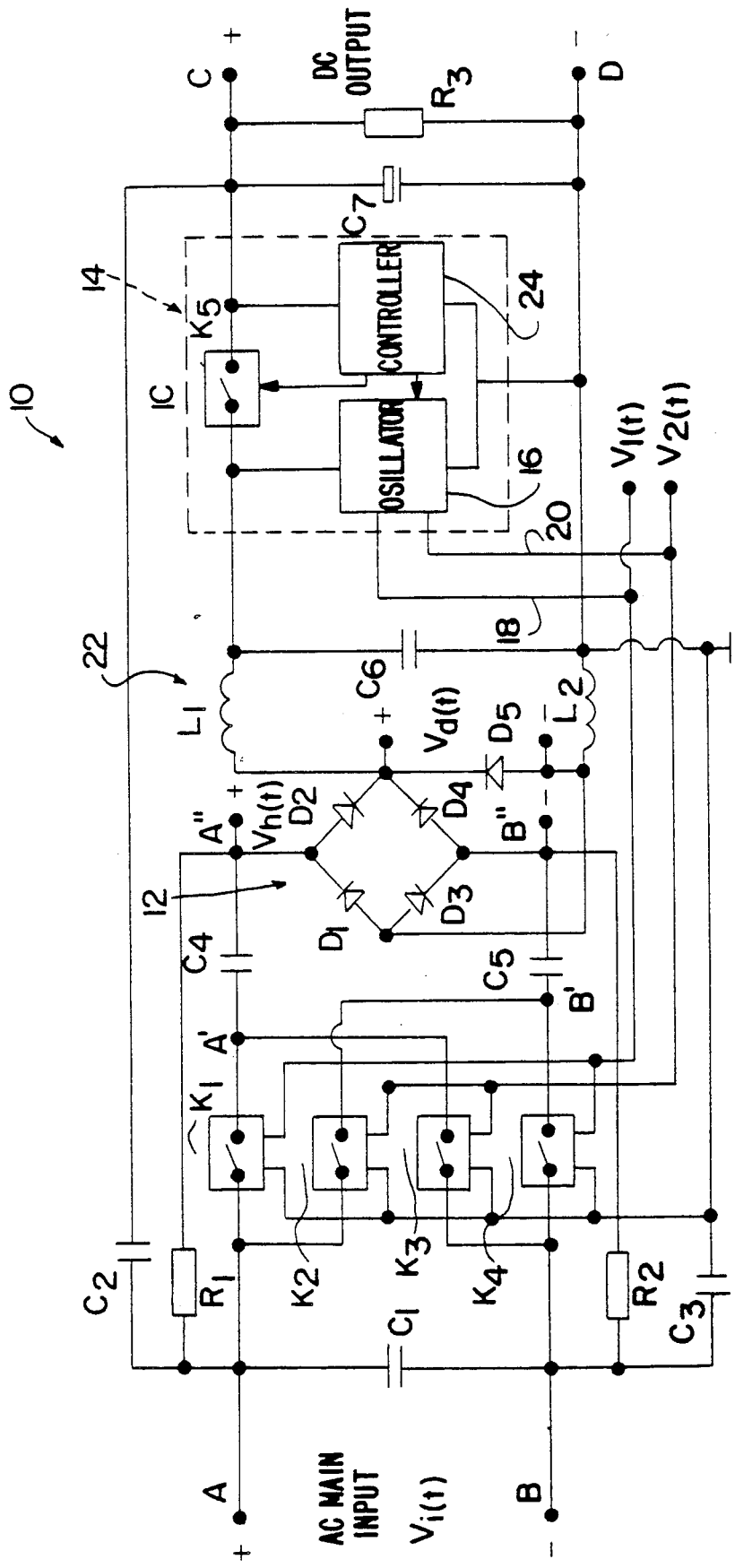
FIG. 1 is a circuit diagram of the solid-state power transformer circuit of the present invention.

Referring now to the drawing figures, there is illustrated in FIG. 1 a solid-state power transformer circuit, generally indicated at 10, constructed in accordance with the present invention. The circuit 10 includes an AC to DC converter or rectifier circuit, generally indicated at 12, since in practice most transformers in consumer electronics are followed by an AC to DC converter. However, it is to be understood that the AC to DC converter circuit 12 does not form part of the solid-state power transformer per se. It is also to be understood that other types of AC to DC converter circuits may be provided without departing from the spirit of the present invention.

The circuit 10 includes a pair of resistors $R_1$ and $R_2$ which have a relatively large value. When an AC main input voltage is initially applied at input terminals A and B, a relatively small AC current flows through the resistors $R_1$ and $R_2$ at the frequency of the AC main input voltage (typically 50, 60 and 400 Hz are the most popular frequencies).

The current flowing through the resistors $R_1$ and $R_2$ is then converted to a small DC current by the converter circuit 12. The converter circuit 12 is made up of a conventional bridge circuit including diodes $D_1$, $D_2$, $D_3$ and $D_4$ as illustrated. A capacitor $C_6$ is connected in parallel across the common nodes of diodes $D_2$ and $D_4$ and diodes $D_1$ and $D_3$. The small DC current provided by the converter circuit 12 sets up a DC voltage on the capacitor $C_6$.

The circuit 10 would also include an integrated circuit (IC), generally indicated at 14. The integrated circuit 14 would include an oscillator 16 which is: connected in parallel across the capacitor $C_6$. When the voltage on the capacitor $C_6$ reaches a certain predetermined value, the oscillator 16 begins to oscillate.

The circuit 10 also includes four electronic: optically-coupled switches $K_1$, $K_2$, $K_3$ and $K_4$. Separate outputs of the oscillator provide time-varying voltage signals $V_1(t)$ and $V_2(t)$ on lines 18 and 20, respectively. The outputs from the oscillator 16 drive the four electronic optically-coupled switches $K_1$, $K_2$, $K_3$ and $K_4$ to close and open according to a predetermined sequence, as now described.

Figure 2A:
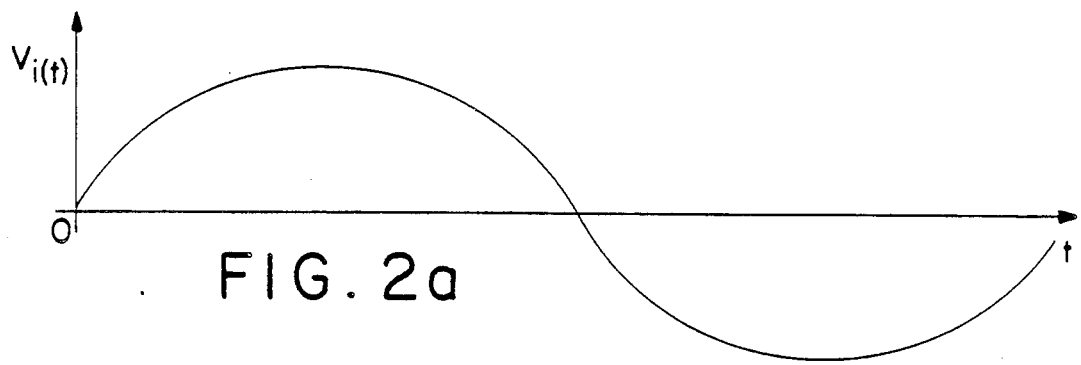
FIGS. 2A through 2C are graphs of voltage versus a common time base at terminals A-B, A'-B', and A"-B", respectively.
Figure 2B:
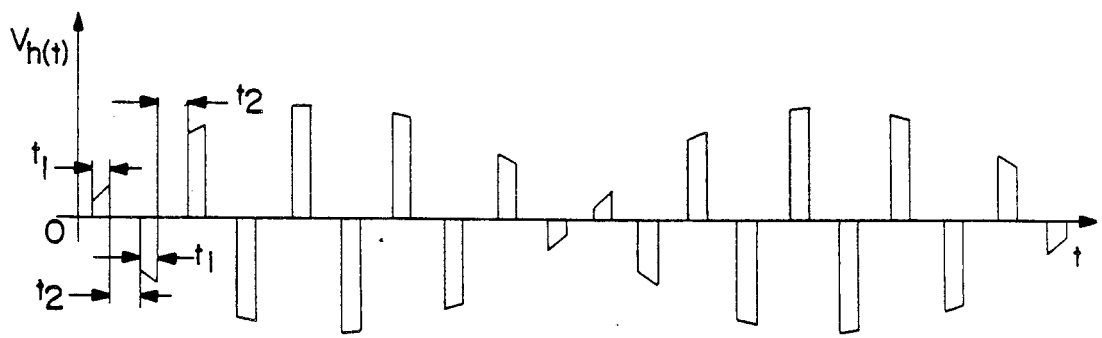

Initially, the outputs appearing on lines 18 and 20 drive switches $K_1$ and $K_4$ closed and switches $K_2$ and $K_3$ open for a time $t_1$, as illustrated in FIG. 2B. During this time period, point A is connected to point A' and point B is connected to point B'.

The circuit 10 also includes capacitors C and $C_5$, which are connected between points A' and A" and between points B' and B", respectively. Point A" corresponds to a common node of diodes $D_1$ and $D_2$ and point B" corresponds to a common node of diodes $D_3$ and $D_4$.

During connection of point A to point A' and point B to point B', while switches $K_1$ and $K_4$ are closed, capacitors $C_4$ and $C_5$ momentarily act as short circuits wherein point A' is shorted to point A" and point B' is shorted to B". The value of capacitors $C_4$ and $C_5$ are relatively small because they are only used to connect A' to A" and B' to B" for a short time ($t_1$) Consequently, at this time $V_h(t)$, the voltage across A" and B", is equivalent to $V_i(t)$ as illustrated in FIGS. 2A and 2B.

Then the output signals from the oscillator 16 open switches K' and K so that all of the switches $K_1$, $K_2$, $K_3$ and $K_4$ are open for a time $t_2$.

In the next time interval, the output signals from the oscillator 16 close switches $K_2$ and $K_3$, thereby connecting point A to point B' and point B to point A'. Again, capacitors $C_4$ and $C_5$ momentarily operate as short circuits, so that $V_h(t)$ equals $-V_i(t)$ for a time $t_1$.

Then the output signals from the oscillator 16 cause the switches $K_2$ and $K_3$ to open so that all of the switches $K_1$, $K_2$, $K_3$, and $K_4$ are, again, open for the time, $t_2$.

The cycle is again repeated by the output signals from the oscillator 16 again closing switches $K_1$ and $K_4$.

Figure 2C:
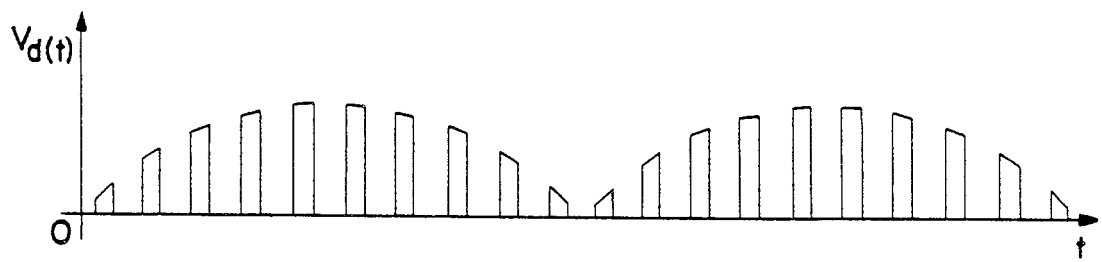

Consequently, it can be readily seen that by controlling the optically-coupled switches $K_1$, $K_2$, $K_3$ and $K_4$ to open and close rapidly, and by coupling through capacitors $C_4$ and $C_5$, a chopped-flipped $V_i(t)$ i.e. $V_h(t)$, is obtained at A" and B". Because the switches turn on and off at a high frequency, (typically about 1 MHz), relatively low values of $C_4$ and $C_5$ are used, thereby presenting a relatively high impedance to the AC main input voltage which has a relatively low frequency (typically 50, 60 or 400 Hz). The high frequency voltage $V_h(t)$ is converted by the converter 12 into unidirectional pulses, $V_d(t)$, as illustrated in FIG. 2C.

A filter circuit, generally indicated at 22, includes inductors $L_1$ and $L_2$ and the capacitor $C_6$, which filter out the AC components in the unidirectional pulses, $V_d(t)$, so that only the DC part of the unidirectional pulses is fed to the integrated circuit 14. Before the DC voltage from the unidirectional pulses arrives at the oscillator 16, the oscillator 16 has been driven by the residual voltage on the capacitor $C_6$, generated by the current through resistors $R_1$ and $R_2$, as previously mentioned.

A diode $D_5$ provides a DC current path for the inductors $L_1$ and $L_2$ when all of the switches $K_1$, $K_2$, $K_3$ and $K_4$ are off.

The integrated circuit 14 also includes a controller 24, which controls the operation of a switch $K_5$ which couples the DC voltage across the capacitor $C_6$ to the output of the circuit 10. A load at the output of the circuit 10 is illustrated by a capacitor $C_7$ and a resistor $R_3$ connected in parallel with one another.

The controller 24 turns on the switch $K_5$ so that the controller 24 and the output of the circuit 10 begins getting current through the capacitors $C_4$ and $C_5$, through the rectifier 12, along the path defined by the inductors $L_1$ and $L_2$ and the capacitor $C_6$, so that a DC voltage is set up at the output of the circuit ((C) and (D)), the DC output points or terminals.

The controller 24 also monitors the output voltage at the DC output nodes. If the voltage at the DC output terminals is over a preset threshold or reference value, the controller 24 controls the oscillator 16 so that the width of the on-time, $t_1$, of the switches $K_1$, $K_2$, $K_3$ and $K_4$ is decreased. If the voltage appearing at the DC output terminals is below the reference level, the width of the on time of the switches $K_1$, $K_2$, $K_3$ and $K_4$ is increased. In this way, the DC output voltage is held to a threshold voltage which can be set to different values for different needs.

Filter means, in the form of capacitors $C_2$ and $C_3$ are connected between first input (A) and output terminal (C) and second input (B) and output terminal (D), respectively, of the input and output terminals of the circuit 10 to suppress radiation of high-frequency harmonics. In other words, the capacitors $C_2$ and $C_3$ suppress the high-frequency voltage harmonics produced during chopping. The values for the capacitors $C_2$ and $C_3$ are relatively small because only high-frequency harmonics need be suppressed.

The total separation or isolation impedance between the AC main input and the DC output equals $Z(C_2)Z(C_3)Z(C_4)Z(C_5)R_1R_2$ where $Z(C)$ is the AC impedance of a capacitor C measured at the frequency of the AC main input voltage (typically 50, 60 or 400 Hz). The sign "" denotes parallel.

Resistors $R_1$ and $R_2$ have relatively large values since only relatively small current need flow in order to start the oscillator 16. The values of capacitor $C_2$, $C_3$, $C_4$ and $C_5$ are conversely relatively small, which means: that a sufficiently large separation impedance is obtained between the AC main input and the DC output. For human safety, 1 M Ohm separation impedance is large enough for 110 volt, 60 Hz main input voltage. This leads to a maximum of 0.1 mA body current, which is less: than the perceptible current level of 1 mA body current.

Using state of the art components and choosing switches $K_1$, $K_2$, $K_3$ and $K_4$ to switch at a relatively high frequency, such as 1 MHz, it is possible to build a 100 Watt solid-state power transformer, with an AC-DC converter circuit, such as the converter circuit 12, having a separation impedance of 1 M Ohm. Lower power, solid-state transformers are even easier to construct.

While a preferred embodiment of the subject invention has been shown and described in detail, those skilled in this art will recognize various alternative designs and embodiments for practicing the present invention as defined by the following claims.

What is claimed is:

1. A solid-state power transformer circuit for converting the positive and negative periods of an AC input signal having a predetermined frequency applied to an input of the circuit into a high frequency signal and, subsequently, converting same to produce a regulated output signal at an output of the circuit, the circuit comprising:

means for chopping said AC input signal at a chopping frequency, said means for chopping being controllable for adjusting the duty cycle of said means for chopping;

first filter means for suppressing the high frequency voltage harmonics produced during chopping; and means for monitoring the output signal and comparing the output signal with a reference signal to produce a control signal for controlling the duty cycle of said means for chopping wherein the output signal is regulated and wherein the first filter means is connected between the input and the output so that the total separation impedance of the circuit at the predetermined frequency of the input signal is sufficient to safely, electrically isolate the output from the input of the circuit.

2. The circuit as claimed in claim 1 further comprising converter means for converting the chopped AC signal to a DC signal.

3. The circuit as claimed in claim 2 wherein said converter means includes a rectifier circuit for rectifying the chopped AC signal to provide a rectified signal having AC components.

4. The circuit as claimed in claim 3 further comprising second filter means for filtering out the AC components of said rectified signal to provide the DC signal.

5. The circuit as claimed in claim 2 further comprising capacitor means for coupling the means for chopping to said convertor means.

6. The circuit as claimed in claim 1 or claim 5 wherein said means for monitoring includes oscillator means and wherein said circuit further comprises starter means including resistor means connected in parallel with said first filter means to produce a start signal coupled to said oscillator means to begin operation of said oscillator means.

7. The circuit as claimed in claim 6 wherein said means for monitoring further includes a controller for comparing the amplitude of the output signal with the amplitude of the reference signal to produce an error signal related to the difference between the two amplitudes, said error signal being fed to said oscillator means to control the on-cycle of said chopping means.

8. The circuit as claimed in claim 1 wherein the predetermined frequency is one of 50 Hz, 60 Hz and 400 Hz.

9. The circuit as claimed in claim 1 wherein the chopping frequency is greater than 5 KHz.

10. The circuit as claimed in claim 1 or claim 5 wherein the input has first and second input terminals and the output has first and second output terminals and wherein the first filter means includes a first capacitor connected between the first input terminal and the first output terminal and a second capacitor connected between the second input terminal and the second output terminal.

11. A solid-state power transformer circuit for converting the positive and negative periods of an AC input signal having a predetermined frequency applied to an input of the circuit into a high frequency signal and, subsequently, converting same to produce a regulated output signal at an output of the circuit, the input having first and second input terminals and the output having first and second output terminals, the circuit comprising:

means for chopping said AC input signal at a chopping frequency, said means for chopping being controllable for adjusting the duty cycle of said means for chopping;

a first capacitor connected between the first input terminal and the first output terminal and a second capacitor connected between the second input terminal and the second output terminal, the first and second capacitors suppressing the high frequency voltage harmonics produced during chopping; and means for monitoring the output signal and comparing the output signal with a reference signal to produce a control signal for controlling the duty cycle of said means for chopping wherein the output signal is regulated and wherein the total separation impedance of the circuit, including the first and second capacitors at the predetermined frequency of the input signal is sufficient to safely, electrically isolate the output from the input of the circuit at the predetermined frequency.

12. A solid-state power transformer circuit for converting the positive and negative periods of an AC input signal having a predetermined frequency applied to an input of the circuit into a high frequency signal and, subsequently, converting same to produce a regulated output signal at an output of the circuit, the input having first and second input terminals and the output having first and second output terminals, the circuit comprising:

means for chopping said AC input signal at a chopping frequency, said means for chopping being controllable for adjusting the duty cycle of said means for chopping;

a first capacitor connected between the first input terminal and the first output terminal and a second capacitor connected between the second input terminal and the second output terminal, the first and second capacitors suppressing the high frequency voltage harmonics produced during chopping;

converter means for converting the chopped AC signal to a DC signal;

capacitor means for coupling the means for chopping to said converter means;

means, including oscillator means, for monitoring the output signal and comparing the output signal with a reference signal to produce a control signal for controlling the duty cycle of said means for chopping wherein the output signal is regulated; and starter means, including resistor means connected through the converter means to said capacitor means to produce a start signal coupled to said oscillator means to begin operation of said oscillator means and wherein total separation impedance of the circuit, including the first and second capacitors, the capacitor means and the resistor means at the predetermined frequency of the input signal is sufficient to safely, electrically isolate the output from the input of the circuit.

* * * * *

UNITED STATES PATENT AND TRADEMARK OFFICE
CERTIFICATE OF CORRECTION

PATENT NO. : 5,119,285

DATED : June 2, 1992

INVENTOR(S) : Gang Liu et al.

It is certified that error appears in the above-identified patent and that said Letters Patent is hereby corrected as shown below:

Column 2, line 4, after "flyback", delete ":";

Column 2, line 21, after "McMurray U.S. Pat.", add --No. 3,517,300, Nijhof et al. U.S. Pat.--;

Column 3, line 21, after "the" and before "power", "solid state" should be --solid-state--;

Column 4, line 14, after "is" and before "con-", delete ":";

Column 4, line 18, after "electronic" and before "optically", delete ":";

Column 4, line 31, after "capacitors" and before "and", "C" should be --$C_4$--;

Column 4, line 47, after "switches" and before "so", "K' and K" should be --$K_1$ and $K_4$--;

Column 5, line 54, "Z($C_2$) Z($C_3$) Z($C_4$) Z($C_5$) $R_1 R_2$" should be --Z($C_2$)\\Z($C_3$)\\Z($C_4$)\\Z($C_5$)\\$\bar{R}_1$\\$R_2$--;

Column 5, line 57, after "sign" and before "denotes", " "" " should be --"\\"--;

Column 5, line 61, after "means" and before "that" eliminate ":";

UNITED STATES PATENT AND TRADEMARK OFFICE
CERTIFICATE OF CORRECTION

PATENT NO. : 5,119,285

DATED : June 2, 1992

INVENTOR(S) : Gang Liu et al.

It is certified that error appears in the above-identified patent and that said Letters Patent is hereby corrected as shown below:

Column 5, line 67, after
  "less" and before "than", delete ":"; and

Column 6, line 7,
  after "power" and before "solid-state", delete "."

Signed and Sealed this

Third Day of August, 1993

MICHAEL K. KIRK

Attest:

Attesting Officer

Acting Commissioner of Patents and Trademarks